May 15, 1945.  A. U. WELCH, JR  2,376,215

ALTERNATING CURRENT CONTROL APPARATUS

Filed Aug. 28, 1943

Inventor:
Alanson U. Welch, Jr,
by Harry E. Dunham
His Attorney.

Patented May 15, 1945

2,376,215

UNITED STATES PATENT OFFICE 2,376,215

ALTERNATING CURRENT CONTROL APPARATUS

Alanson U. Welch, Jr., Pittsfield, Mass., assignor to General Electric Company, a corporation of New York Application August 28, 1943, Serial No. 500,395

15 Claims. (Cl. 315—276)

My invention relates to alternating current control apparatus for reactive circuits.

It is particularly suited for reducing the open circuit voltage of an alternating current arc welding circuit embodying arc stabilizing reactance.

Trade and sometimes legal requirements make it necessary to limit the open circuit voltages of arc welding circuits to values less than those required for desired operating characteristics. Thus for purposes of arc stability it may be desirable to have an open circuit voltage across the welding arc conductors of 75 volts when the operating voltage during welding is from 25 to 40 volts. But the desired 75 volts may under certain conditions be sufficient to cause an operator coming in contact therewith to experience a disagreeable or annoying sensation and consequently trade and legal requirements often limit the open circuit voltage to 50 volts or some similar value less than the 75 volts.

It is an object of my invention to provide apparatus in which a control voltage of desired value is quickly substituted for the greater open circuit voltage that would otherwise appear across the load conductors of a reactive circuit which forms part of the apparatus and serves to connect a resistance load, such as an arc, to an alternating current supply circuit.

It is a further object of my invention to provide automatic arc welding apparatus which quickly reduces the voltage of the welding arc conductors when not welding and quickly applies full voltage thereto immediately on starting to weld.

Further objects of my invention will become apparent from a consideration of the apparatus illustrated in the accompanying drawing.

Figure 1:
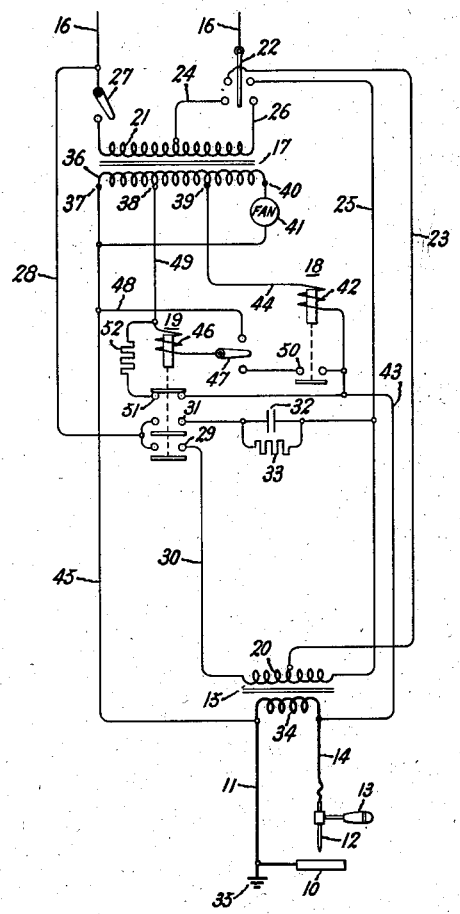
Figure 3:
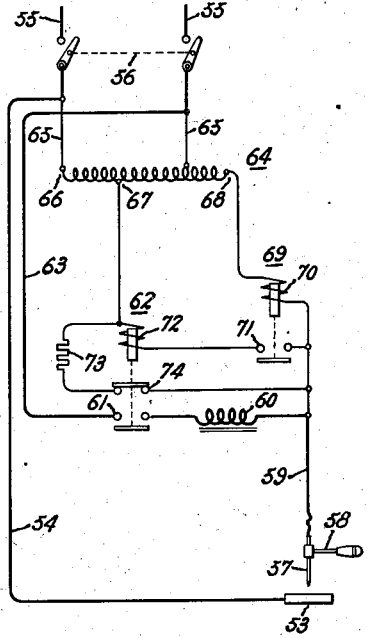
Figure 2:
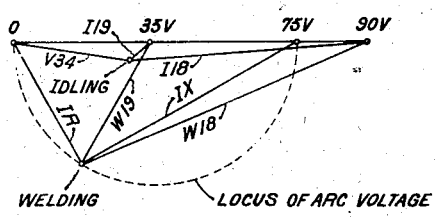

In this drawing Fig. 1 diagrammatically represents apparatus for alternating current arc welding in which the arc stabilizing reactance is built into an arc welding transformer forming part of the welding circuit; Fig. 2 diagrammatically represents the voltage conditions existing therein before welding and during welding; and Fig. 3 diagrammatically represents alternating current arc welding apparatus in which the arc stabilizing reactance is a reactor connected between the supply conductors and the welding conductors.

In accordance with my invention a reactive circuit having conductors for energizing a load which is substantially resistance, is connected to an alternating current supply circuit in response to the establishment of a circuit through the load conductors and this connection is maintained so long as the voltage across the load conductors is less than a predetermined value. This result is accomplished by a control embodying two relays, one of which controls the operation of the other and each of which has an operating winding which is connected across the load conductors in circuit with a different voltage of a voltage establishing means which is energized from the supply circuit. The different voltages of the voltage establishing means are sufficient to operate these relays before the reactive circuit has been energized from the supply circuit. After the reactive circuit has been connected with the supply circuit, these different voltages combine with the voltage across the load conductors to produce resultant voltages which maintain the connection thereof as long as the voltage across the load conductors is less than a predetermined value. That voltage of the voltage establishing means which appears across the load conductors when the reactive circuit is disconnected from the supply circuit, need only be sufficiently high to initiate the operation of the relays forming part of the circuit and consequently may be much lower than the open circuit voltage that appears across the load conductors when the reactive circuit is connected to the source of supply.

In Fig. 1 the reactive circuit is a welding circuit having load conductors for energizing an arc. The work 10 is connected by one load conductor 11 and the electrode 12 supported in the electrode holder 13 is connected by the other load conductor 14 to a source of alternating current supply through a reactive welding transformer 15 and supply conductors 16.

The connection of transformer 15 with supply conductors 16 is controlled by an auxiliary or control transformer 17 and relays 18 and 19.

The primary winding 20 of welding transformer 15 and the primary winding 21 of control transformer 17 are provided with sections one or both of which may be connected across supply conductors 16 depending upon the voltage of the source of supply. These connections are controlled by a tap switch 22 which when thrown to the left connects one of the supply conductors 16 to the mid-terminals of the primaries 20 and 21 of these transformers through conductors 23 and 24 and when thrown to the right connects the same conductor 16 to the right terminals of these primaries through conductors 25 and 26. The other supply conductor 16 is connected to the left terminal of the primary 21 of transformer 17 through a switch 27 and to the left terminal of primary 20 of welding transformer 15 through conductor 28, normally open contacts 29 of relay 19, and conductor 30. Normally open contacts 31 of relay 19 also connect a power-factor correcting capacitor 32 across the outer terminals of the primary 20 of welding transformer 15 through conductors 25 and 30. A discharge resistor 33 is connected across the terminals of capacitor 32.

The terminals of the secondary winding 34 of welding transformer 15 are connected to the load or welding arc conductors 11 and 14. Conductor 11 which is connected to the work 10 may be grounded as shown at 35.

The secondary winding 36 of control transformer 17 is provided with terminals 37, 38, 39 and 40 between which are established voltages of predetermined phase and magnitude relative to the voltage of the source of supply connected to conductors 16. The voltages between terminals 37, 38 and 39, alone or in combination with the voltages across welding arc conductors 11 and 14, control the operation of relays 18 and 19. The voltage across terminals 37 and 40 may be used for operating a ventilating fan 41 or for energizing some similar auxiliary circuit forming part of the control.

The operating winding 42 of relay 18 is connected across welding arc conductors 11 and 14 through conductors 43, 44 and 45 in circuit with the voltage between terminals 37 and 39 of the secondary winding 36 of control transformer 17. The operating winding 46 of relay 19 is provided with two connections which are determined by a switch 47. When this switch is in its upper position, winding 46 is connected across terminals 37 and 38 of the secondary winding 36 of control transformer 17 through conductors 45, 48 and 49. When this switch 47 is in its lower position, winding 46 of relay 19 is connected across welding arc conductors 11 and 14 in circuit with the voltage across terminals 37 and 38 of secondary 36 of control transformer 17 through conductors 45 and 49, switch 47, normally open contacts 50 of relay 18 and conductor 43. Normally closed contacts 51 of relay 19 connect a resistor 52 in shunt to its operating coil 46 and contacts 50 of relay 18 connected in series with coil 46.

The organization of the control circuit just described will be better understood by considering its operation.

The control is shown in its deenergized condition with hand operated switches open and the relays in the positions they assume when deenergized.

In accordance with the voltage of the source of supply, tap switch 22 is thrown to the right or to the left to connect with supply conductors 16 the proper number of sections of primaries 20 and 21 of transformers 15 and 17. Thereafter the closure of switch 27 will energize the entire control.

Switch 47 permits the operator to set the control for operation during idling with automatic voltage reduction or with maintained arc welding voltage.

If this switch 47 is closed in its upper position, winding 46 of relay 19 is connected across terminals 37 and 38 of the secondary winding of control transformer 17. It consequently closes its contacts 29 and 31 which respectively connect primary winding 20 of welding transformer 15, and capacitor 32 in parallel with one another across supply conductors 16. These connections are maintained so long as switch 47 is closed in its upper position and consequently after each welding operation the full open circuit voltage of secondary 34 of the welding transformer will appear across welding arc conductors 11 and 14.

If switch 47 is closed in its lower position the high open circuit voltage across the welding arc conductors is reduced to the low value appearing across terminals 37 and 38 of the secondary winding of control transformer 17.

The voltages established across terminals 37—38 and 37—39 of secondary 36 of control transformer 17 alone or in combination with the voltage across the load or welding arc conductors 11 and 14 operate relays 18 and 19 to control the connection of primary winding 20 of welding transformer 15 with supply conductors 16 in response to the establishment of a circuit through these conductors and to maintain this connection so long as the voltage across these conductors is less than a predetermined value. The operating windings of these relays are responsive to the voltages of a network formed by connecting load conductor 11 to the first terminal 37 of the voltage establishing means 17 and by connecting the other load conductor 14 through the operating winding 42 of the first mentioned relay 18 to the third terminal 39 of this voltage establishing means and through contacts 50 of the first mentioned relay and operating winding 46 of the second mentioned relay to the second terminal 38 of this voltage establishing means.

In one embodiment of the arrangement illustrated in Fig. 1 the secondary winding 34 of welding transformer 15 has an open circuit voltage of 75 volts and due to the high reactance between its primary and secondary windings, an operating or load voltage of from 25 to 40 volts. In this embodiment the voltage across terminals 37 and 38 of the secondary winding of control transformer 17 is 35 volts and the voltage across terminals 37 and 39 of the secondary winding of this control transformer is 90 volts. Furthermore, in this embodiment, relay 18, having an 80 volt winding, picks up at about 60 per cent rated voltage and drops out at about 50 per cent rated voltage and relay 19, having a 35 volt operating winding, picks up at about 80 per cent rated voltage and drops out at about 50 per cent rated voltage.

Immediately after a welding operation has been terminated by relay 18 opening its contacts 50 and thereby deenergizing relay 19, operating winding 42 of relay 18 is connected to the 55 volts appearing across terminals 38 and 39 of the secondary winding of control transformer 17 through conductors 44, 43, 49 and resistor 52. Since the exciting impedance of welding transformer 15 and the resistance of resistor 52 are much lower than that of relay 18 most of this voltage appears across its winding 42, causing this relay immediately to close its contacts 50 and again connect operating winding 46 of relay 19 across welding arc conductors 11 and 14 in circuit with the 35 volts appearing across terminals 37 and 38 of the secondary winding of control transformer 17.

Consequently, when idling, primary 20 of the welding transformer is disconnected from supply conductors 16 and its secondary 34 is excited from the 35 volt section of control transformer 17.

In this embodiment the amount of current required to excite the welding transformer at reduced voltage, although only a few amperes, is sufficient if carried by winding 46 of relay 19 to cause this relay to pick up. Consequently, resistor 52 is connected through contacts 51 of relay 19 in parallel with its operating winding and contacts 50 of relay 18 connected in circuit therewith. This resistor is so chosen that when carrying the exciting current of the welding transformer the voltage drop across it and winding 46 of relay 19 in parallel therewith is not sufficient to pick up relay 19. Obviously 52 need not be a resistor as shown but may be a reactor, choice being a matter of economics.

Resistor 52 is not a necessary part of the circuit and is required only when the exciting current of the welding transformer is more than the winding of relay 19 will carry without causing the relay to pick up. If the welding transformer were designed for low exciting current, resistor 52 could be omitted and consequently after a welding operation had been terminated by relay 18 opening its contacts 50 and thereby deenergizing relay 19, operating winding 42 of relay 18 would be connected to the 90 volts appearing across terminals 37 and 39 of the secondary winding of control transformer 17. Then since the exciting impedance of welding transformer 15 is much lower than that of relay 18 most of this 90 volts will appear across its winding 42 and will cause this relay immediately to close its contacts 50 and again connect operating winding 46 of relay 19 across welding arc conductors 11 and 14 in circuit with the 35 volts appearing across terminals 37 and 38 of the secondary winding of control transformer 17.

When welding is started by short circuiting welding arc conductors 11 and 14, the voltage across the secondary of the welding transformer 15 is forced to go to a value approximating zero and the 35 volts between terminals 37 and 38 of the secondary winding of control transformer 17 is then applied to the operating winding 46 of relay 19 and across the parallel connected resistor 52. This causes the relay to pick up and close its contacts 29 and 31 and open its contacts 51. The closure of contacts 29 connects primary 20 of welding transformer 15 to supply conductor 16 and the closure of contacts 31 connects capacitor 32 in parallel with the primary of the welding transformer across these same supply conductors 16. The opening of contacts 51 disconnects resistor 52 from the circuit since this resistor is suitable for carrying for only a short time the comparatively high current resulting from short circuiting the welding arc conductors 11 and 14.

During welding so long as the voltage across welding arc conductors 11 and 14 does not become greater than a predetermined value, both coils 18 and 19 are picked up by the voltages applied to their operating windings. These voltages are the resultant of the voltages across the terminals of the secondary winding of control transformer 17 and the voltage across welding arc conductors 11 and 14. When the voltage across these conductors exceeds this predetermined value, relay 18 drops out opening its contacts 50 and thereby deenergizing relay 19 which then drops out and opens the connection of the primary winding of the welding transformer with supply conductors 16. This deenergizes the welding circuit and immediately thereafter relay 18 picks up closing its contacts 50 which reestablishes across conductors 11 and 14 the 35 volt control voltage between terminals 37 and 38 of the secondary winding of control transformer 17. This voltage is sufficiently low to reduce the probability of electric shock yet sufficiently high to make a reliable circuit through any scale, dirt or the like on the work 10 when electrode 12 is brought into engagement therewith at the beginning of another welding operation.

The voltage conditions existing in the control circuit during welding and during idling have been illustrated in the diagram of Fig. 2. In this diagram the voltage values between points 0 and 35V and 0 and 90V correspond, respectively, to the voltages between terminals 37 and 38 and 37 and 39 of the secondary winding of control transformer 17. The voltage value between 0 and 75V corresponds to the open circuit voltage of welding transformer 15 when its primary is connected to the source of supply through conductors 16. These voltages are in phase with one another since the primaries of transformers 15 and 17 are both connected to the same supply conductors.

As pointed out above, welding transformer 15 is of the high reactance type with considerable reactance between its primary and secondary windings. When welding, consequently, its secondary voltage drops from the normal open circuit value of 75 volts down to an operating range of from 25 to 40 volts. The welding arc can be considered to be substantially a pure resistance. The voltage drop in the transformer is substantially a pure reactance voltage. These voltages, consequently, add vectorially at right angles. Therefore, in the diagram of Fig. 2 the voltage drop across the arc is represented by the line IR running from O to the point marked "Welding" and the reactance drop IX in the transformer is represented by the line running from the point marked "Welding" to the point marked 75V. If the arc voltage should be higher than that represented in the diagram, it will always reach some point of the semi-circle marked "Locus of arc voltage" because a line drawn from that point to 75V will always be at 90° with the arc voltage IR.

During idling the voltages applied to the operating windings of relays 18 and 19 have been identified in the diagram as I18 and I19. The voltage across the secondary 34 of the welding transformer during idling has also been indicated in this diagram as V34. I18 maintains contacts 50 of relay 18 closed and I19 is not sufficient to cause relay 19 to pick up.

During welding the voltages across relays 18 and 19 have been indicated in the diagram as W18 and W19. W18 is still sufficient to maintain contact 50 of relay 18 closed and W19 is sufficient to cause relay 19 to pick up. W18 is the vector difference of voltages IR and 0–90V and W19 is the vector difference of voltages IR and 0–35V. Irrespective of considerable variation in the value of welding arc voltage, it will be noted that the voltage W19 applied to relay 19 is substantially constant. On the other hand, when the voltage across the welding arc becomes excessive, the voltage value W18 applied to relay 18 finally becomes insufficient to maintain contacts 50 of this relay closed and it consequently drops out deenergizing relay 19 which in turn disconnects primary 20 of welding transformer 15 from supply conductors 16.

It will thus be seen that the control automatically reduces the secondary voltage of the welding transformer when not welding and applies full voltage immediately on starting to weld. No time delay is provided in this control and it has the advantage of very fast pickup when starting to weld and quick drop out when welding stops. It is also to be noted that during welding the vector diagram is determined substantially by the welding conditions and not by the impedances of the relays since the welding current is measured in hundreds of amperes and the current in the relay windings is measured in amperes.

From a consideration of the operation of the system of Fig. 1 as exemplified in the diagram of Fig. 2, it is apparent that it is immaterial whether the arc stabilizing reactance is built into the transformer or is in a separate reactor located in the welding circuit. The same vector relationships will be obtained and the system will function in the manner described. Obviously, the control will not work if the stabilizing impedance for the arc is a resistance for in such a case the voltage drops would all be parallel to the top line of the diagram and the desired voltage relationships would not be obtained.

In Fig. 3 I have demonstrated an application of my invention to a constant potential alternating current circuit embodying an arc stabilizing reactor. In this figure the work 53 is connected by a welding conductor 54 to one of the supply conductors 55 through one of the blades of a switch 56 and the arc welding electrode 57 in electrode holder 58 is connected through a welding conductor 59, a reactor 60, the normally open contacts 61 of a relay 62 and a conductor 63 to the other conductor of supply circuit 55 through the other blade of switch 56. The control transformer 64 is an autotransformer having its winding provided with primary leads 65 and secondary taps 66, 67 and 68. Leads 65 are connected to supply conductors 55 through switch 56. A relay 69 has an operating winding 70 connected across the welding conductors in circuit with the voltage between terminals 66 and 68 of control transformer 64. This relay has normally open contacts 71 which connect operating winding 72 of relay 62 across the welding conductors in circuit with the voltage between terminals 66 and 67 of the secondary winding of control transformer 64. A resistor 73 is connected through normally closed contacts 74 of relay 62 across the operating winding of this relay and the series connected contacts 71 of relay 69.

It will be noted that in Fig. 3 the welding circuit includes inductive reactance 60 corresponding to the inductive reactance of welding transformer 15 of Fig. 1 and that relays 62 and 69 correspond respectively in their connections in the system with relays 19 and 18 of Fig. 1. Control transformer 64 of Fig. 3 is energized from a 75 volt welding source of supply through conductors 55 and 65 and the voltages across terminals 66 and 67 and 66 and 68 of its secondary winding like those across corresponding terminals of control transformer 17 of Fig. 1 are respectively 35 and 90 volts. In the arrangement of Fig. 3, however, there is no exciting impedance of a welding transformer secondary shunted across the welding conductors. Therefore, resistor 73 becomes essential to hold relay 69 closed for quick pickup of relay 62 and is also essential to hold the potential across the welding conductors during idling down to the 35 volts across terminals 66 and 67 of the secondary winding of control transformer 64 for otherwise it would be the 90 volts existing across terminals 66 and 68 of this control transformer.

In view of the complete description of the operation of the system shown in Fig. 1 only a brief description will now be given of the operation of the system shown in Fig. 3 which has the same mode of operation.

At the end of a welding operation relay 69 drops out opening its contacts 71. It thereby deenergizes relay 62 which drops out opening its contacts 61 and thereby disconnecting the welding circuit 54—59 from supply circuit 55. When relay 62 drops out it also closes its contacts 74 and connects resistor 73 in circuit with operating winding 70 of relay 69 across terminals 67, 68 of the secondary winding of control transformer 64. Relay 69 consequently picks up closing its contacts 71 which thereby connect the operating winding 72 of relay 62 across welding conductors 54 and 59 in circuit with the voltage across terminals 66 and 67 of the secondary winding of control transformer 64.

When the operator touches the work 53 with electrode 57 at the beginning of the next welding operation, relay 62 picks up and completes the connection of the welding circuit through its contact 61 to supply conductors 55.

Thereafter the operation of the system is the same as that exemplified in the diagram of Fig. 2 for the system shown in Fig. 1, that is, the voltage values W18 and W19 appear across the operating windings of relays 69 and 62. If the arc voltage or voltage across welding conductors 54 and 59 exceeds a predetermined value, relay 69 drops out and thereafter the system sets itself for a new welding operation which is initiated in the manner above described.

From what has been stated above, it is apparent that arc stabilizing reactance may be built in the form of a separate reactor connected in series with either the primary or secondary windings of the welding transformer in the arrangement of Fig. 1, if the built-in reactance of this transformer is not suitable for arc stabilizing purposes. Furthermore, in a system such as shown in Fig. 1 a small capacitor may be permanently connected across the primary winding of the welding transformer to cut down surge voltages resulting from switching. Such a capacitor will be so small as not to affect the operation of the control in the manner above described. Capacitor 32 of the system shown in Fig. 1 has no effect on the operation of the control for when idling the capacitor is disconnected and when welding the capacitor is connected across the primary circuit which has a fixed voltage. As previously indicated, capacitor 32 is used only for power factor correction of the load.

One of the most important features of the controls above described is that the pickup of a single relay is all that is required to change the connections of the control from an idling condition to a welding condition. Furthermore, the pickup of a single relay, which on drop out interrupted the connection of the welding circuit with the supply conductors, restores the system to its idling condition. Obviously, the systems are very simple and take full advantage of the voltage values in a reactive circuit which supplies a load which is substantially resistance.

In view of the above description of two systems embodying my invention other systems and modifications of the systems illustrated will occur to those skilled in the art. I aim, consequently, to cover by the appended claims all those modifications which fall within the true spirit and scope of my invention.

What I claim as new and desire to secure by Letters Patent of the United States is:

1. Alternating current control apparatus comprising a supply circuit, a load circuit having a portion which is substantially reactance connected in circuit with conductors for energizing a load which is substantially resistance, means energized from said supply circuit for establishing a plurality of different voltages, and means for connecting said load circuit with said supply circuit in response to the establishment of a circuit through said load conductors and for maintaining said connection so long as the voltage across said load conductors is less than a predetermined value, said means including two relays, one of which controls the operation of the other and each of which has an operating winding which is connected across said load conductors in circuit with a different voltage of said voltage establishing means, said different voltages alone being sufficient to operate said relays before said load circuit has been energized from said supply circuit, and thereafter combining with the voltage across said load conductors to produce resultant voltages which control the operation of said relays.

2. Alternating current control apparatus comprising a supply circuit, a load circuit having a portion which is substantially reactance connected in circuit with conductors for energizing a load which is substantially resistance, means energized from said supply circuit for establishing a plurality of different voltages, and means for connecting said load circuit with said supply circuit in response to the establishment of a circuit through said load conductors and for maintaining said connection so long as the voltage across said load conductors is less than a predetermined value, said means including an impedance, a relay having normally open contacts and an operating winding connected across said load conductors in circuit with one of said voltages of said voltage establishing means, and a second relay having its operating winding connected across said load conductors in circuit with said contacts of said first mentioned relay and another voltage of said voltage establishing means, said second relay having normally open contacts controlling the connections of said load circuit with said supply circuit and normally closed contacts completing a shunt circuit about its said operating winding and said contacts of said first mentioned relay connected in circuit therewith.

3. Alternating current control apparatus comprising supply conductors, load conductors, a reactive circuit between said supply conductors and said load conductors, means energized from said supply conductors and having second and third terminals between which and a first terminal are established voltages of predetermined phase and magnitude, and a relay network in which said first terminal of said voltage establishing means is connected to one of said load conductors and the other of said load conductors is connected through the operating winding of a relay to said third terminal of said voltage dividing means and through the normally open contacts of said first mentioned relay and the operating winding of a second relay to said second terminal of said voltage dividing means, said second relay having normally open contacts controlling the connection of said load conductors with said supply conductors through said reactive circuit and the operating voltages of said relays being less than said voltages of said voltage establishing means and such relative to the voltage of said reactive circuit that, for desired operating values of voltage across said load conductors, the voltages of said network maintain both of said relays sufficiently energized to maintain their contacts closed.

4. Alternating current control apparatus comprising a supply circuit, a load circuit having an inductive device connected in circuit with a pair of conductors for energizing a load which is substantially resistance, an impedance, first and second relays having operating windings and contacts controlled thereby, one terminal of the operating winding of said first relay being connected to one of said load conductors and one terminal of the operating winding of said second relay through the normally open contacts of said first relay and said second relay having normally open contacts which complete the connection of said supply circuit with said load conductors through said load circuit and normally closed contacts which complete a shunt circuit through said impedance about said operating winding of said second relay and said normally open contacts of said first relay, and a voltage establishing means energized from said supply circuit and having a first terminal connected to the other of said load conductors and second and third terminals respectively connected to the other terminals of said operating windings of said second and first relays, the voltage between said first and second terminals of said voltage establishing means having a magnitude sufficient to cause said second relay to close its said contacts when said load conductors are short circuited before said load circuit is connected to said supply circuit and sufficient when vectorially combined with an operating voltage across said load conductors after said load circuit has been connected to said supply circuit to produce a resultant voltage which causes said second relay to maintain its said contacts closed, the connected voltage of said voltage establishing means having a magnitude sufficient to cause said first relay to close its said contacts, and the voltage between said first and third terminals of said voltage establishing means having a magnitude sufficient when vectorially combined with said operating voltage across said load conductors to produce a resultant voltage which causes said first relay to maintain its said contacts closed so long as said operating voltage is less than a predetermined value.

5. Alternating current control apparatus comprising a supply circuit, a load circuit having a portion which is substantially reactance connected in circuit with conductors for energizing a load which is substantially resistance, means energized from said supply circuit for establishing first and second voltages in phase with and respectively greater than and less than the open circuit voltage of said load conductors when said load conductors are energized from said supply circuit through said load circuit, and means for connecting said load circuit with said supply circuit in response to the short circuiting of said load conductors and for maintaining said connection so long as the voltage across said load conductors is less than a predetermined value, said means including a relay having normally open contacts and an operating winding which is connected across said load conductors in circuit with said first voltage of said voltage establishing means, and a second relay having normally open contacts controlling the connection of said load circuit with said supply circuit, and an operating winding which is connected across said load conductors in circuit with said contacts of said first mentioned relay and said second voltage of said voltage establishing means.

6. Control apparatus comprising an alternating current supply circuit, a reactive circuit including the primary and secondary windings of a transformer, means including conductors connected in circuit with the secondary winding of said transformer for energizing a load which is substantially resistance, means energized from said supply circuit for establishing first and second voltages in phase with and respectively greater than and less than the open circuit voltage of said load conductors when said load conductors are energized from said supply circuit through said reactive circuit, and means for connecting said load conductors with said supply circuit through said reactive circuit in response to the short circuiting of said load conductors and for maintaining said connections so long as the voltage across said load conductors is less than a predetermined value, said means including an impedance, a first relay having normally open contacts and an operating winding which is connected across said load conductors in circuit with said first voltage of said voltage establishing means, and a second relay having a winding which is connected across said load conductors in circuit with said contacts of said first relay and said second voltage of said voltage establishing means, said second relay having normally open contacts controlling the connection of said reactive circuit with said supply circuit and normally closed contacts completing a shunt circuit through said impedance and about its said operating winding and said contacts of said first relay connected in circuit therewith.

7. Control apparatus comprising an alternating current supply circuit, a reactive circuit including the primary and secondary windings of a transformer, means including conductors connected in circuit with said secondary winding of said transformer for energizing a load circuit which is substantially resistance, a control transformer having its primary winding connected to said supply circuit and its secondary winding provided with terminals between which are established first and second voltages in phase with and respectively greater than and less than the open circuit voltage of said load conductors when said load conductors are energized from said supply circuit through said reactive circuit, and means for controlling the connection of the transformer primary winding side of said reactive circuit with said supply circuit in response to the short circuiting of said load conductors and for maintaining said connection so long as the voltage across said load conductors is less than a predetermined value, said means including a first relay having normally open contacts and an operating winding which is connected across said load conductors in circuit with said first voltage between said terminals of said secondary winding of said control transformer, and a second relay having normally open contacts controlling the connection of the transformer primary winding side of said reactive circuit with said supply circuit and having an operating winding which is connected across said load conductors in circuit with said second voltage between said terminals of said secondary winding of said control transformer and with said contacts of said first mentioned relay.

8. Control apparatus comprising an alternating current supply circuit, an inductive circuit including the primary and secondary windings of a transformer, means including conductors connected in circuit with said secondary winding of said transformer for energizing a load circuit which is substantially resistance, a control transformer having its primary winding connected to said supply circuit and its secondary winding provided with terminals between which are established first and second voltages in phase with and respectively greater than and less than the open circuit voltage of said load conductors when said load conductors are energized from said supply circuit through said inductive circuit, and means for controlling the connection of the transformer primary winding side of said inductive circuit with said supply circuit in response to the short circuiting of said load conductors and for maintaining said connection so long as the voltage across said load conductors is less than a predetermined value, said means including an impedance, a first relay having normally open contacts and an operating winding which is connected across said load conductors in circuit with said first voltage between said terminals of said secondary winding of said control transformer, and a second relay having an operating winding connected across said load conductors in circuit with said second voltage between said terminals of said secondary winding of said control transformer and with said contacts of said first relay, said second relay having normally open contacts controlling the connection of the transformer primary winding side of said inductive circuit with said supply circuit and normally closed contacts which complete a shunt circuit through said impedance and about its said operating winding and said normally open contacts of said first relay.

9. Alternating current control apparatus comprising a supply circuit, a load circuit having a portion which is substantially reactance connected in circuit with conductors for energizing a load which is substantially resistance, means for establishing voltages of predetermined magnitude and phase relation relative to the voltage across said supply circuit, a relay having an operating winding which is connected to be energized from said voltage establishing means before said load circuit is energized from said supply circuit and which is also connected to be energized by the vector difference of one of said voltages of said voltage establishing means and the operating voltage across said load conductors of said load circuit after said load circuit has been energized from said supply circuit, said relay having contacts which are closed when its said operating winding is energized from said voltage establishing means before said load circuit is energized from said supply circuit and which are maintained closed after said load circuit has been energized from said supply circuit so long as the operating voltage across said load conductors of said load circuit is less than a predetermined value, and a second relay having an operating winding which is connected to be energized through said contacts of said first mentioned relay from said voltage establishing means by short circuiting said load conductors of said load circuit before said load circuit is energized from said supply circuit and which is also connected to be energized by the vector difference of another of said voltages of said voltage establishing means and the operating voltage across said load conductors of said load circuit after said load circuit has been connected to said supply circuit, said second relay having contacts which are closed and complete the connection of said load circuit with said supply circuit when said load conductors of said load circuit are short circuited before said load circuit is energized from said supply circuit and which are maintained closed so long as an operating voltage exists across said load conductors of said load circuit after said load circuit has been energized from said supply circuit.

10. Alternating current control apparatus comprising a relay having an operating winding and normally open contacts controlled thereby, a second relay having an operating winding and normally open contacts controlled thereby, supply conductors, load conductors, a reactive circuit connecting said supply conductors to said load conductors through said contacts of said second relay, a voltage establishing means energized from said supply conductors and having second and third terminals between which and a first terminal are established voltage values respectively less than and greater than the open circuit voltage across said load conductors when said load conductors are energized from said supply conductors through said reactive circuit, and means for completing the connection of said load conductors with said supply conductors through said reactive circuit when said load conductors are momentarily short circuited and thereafter maintaining said connection so long as the operating voltage of said load conductors is maintained below a predetermined desired operating value, said means including a network formed by connecting one of said load conductors to said first terminal of said voltage establishing means and the other of said load conductors through the operating winding of said first mentioned relay to said third terminal of said voltage establishing means and through the contacts of said first mentioned relay and the operating winding of said second mentioned relay to said second terminal of said voltage establishing means.

11. Alternating current control apparatus comprising a supply circuit, a load circuit having a portion which is substantially reactance connected in circuit with conductors for energizing a load which is substantially resistance, means for establishing in phase with the voltage across said supply circuit a voltage greater than and a voltage less than the open circuit voltage across said load conductors when said load circuit is energized from said supply circuit, a relay having an operating winding which is connected to be energized from said voltage establishing means before said load circuit is energized from said supply circuit and which is also connected to be energized by the vector difference of said first mentioned voltage of said voltage establishing means and an operating voltage existing across said load conductors when said load circuit is energized from said supply circuit, said relay having contacts which are closed when its said operating winding is energized by either of said connections so long as in said second connection the operating voltage across said load conductors is less than a predetermined value, and a second relay having an operating winding which is connected to be energized through said contacts of said first mentioned relay from said voltage establishing means by short circuiting said load conductors of said load circuit before said load circuit is energized from said supply circuit and which is also connected to be energized by the vector difference of said second mentioned voltage of said voltage establishing means and an operating voltage across said load conductors when said load circuit is energized from said supply circuit, said second relay having contacts which are closed and complete the connection of said load circuit with said supply circuit when its said operating winding is energized by either of said connections.

12. Alternating current control apparatus comprising a reactive circuit including a transformer having primary and secondary windings, load conductors connected to said secondary winding of said transformer, a supply circuit for energizing said primary winding of said transformer, voltage establishing means energized from said supply circuit and providing a plurality of voltages one of which is greater than and another of which is less than the open circuit voltage across said load conductors when the primary winding of said transformer is energized from said supply circuit, and means including a plurality of relays for controlling the connection of said primary winding of said transformer with said supply circuit, one of said relays having a winding which is connected across said load conductors in circuit with said greater voltage of said voltage establishing means and contacts which are opened when the energization of its said winding is decreased by the voltage across said load conductors become greater than a predetermined value, and another of said relays having an operating winding which is connected across said load conductors in circuit with said contacts of said first mentioned relay and said lesser voltage of said voltage establishing means, and contacts which are closed when its said operating winding is energized solely from said voltage of said voltage establishing means by short circuiting said load conductors and maintained closed when its said operating winding is energized by the network voltage resulting from combining said voltage of said voltage establishing means with the operating voltage across said load conductors.

13. Alternating current arc welding apparatus comprising an alternating current supply circuit, a welding circuit having a reactor connected in circuit with conductors for energizing a welding arc, means energized from said supply circuit for establishing first and second voltages in phase with and respectively greater than and less than the open circuit voltage of said welding conductors when said welding conductors are energized from said supply circuit through said welding circuit, and means for connecting said welding circuit with said supply circuit in response to the short circuiting of said welding arc conductors and for maintaining said connection so long as the voltage across said welding arc conductors is less than a predetermined value, said means including a resistor and two relays one of which has normally open contacts and an operating winding which is connected across said welding arc conductors in circuit with said first voltage of said voltage establishing means and the other of which has an operating winding which is connected across said welding arc conductors in circuit with said contacts of said first relay and said second voltage of said voltage establishing means, said second relay having normally open contacts controlling the connections of said welding circuit with said source of supply and normally closed contacts completing a shunt circuit through said resistor and about its said operating winding and said contacts of said first relay connected in circuit therewith.

14. Alternating current arc welding apparatus comprising a supply circuit, a welding circuit having a reactor connected in circuit with conductors for energizing a welding arc, means for establishing voltages of predetermined magnitude and phase relation relative to the voltage across said supply circuit, and means including first and second relays for connecting said welding circuit with said supply circuit in response to the short circuiting of said welding arc conductors and for maintaining said connection in response to the resultant of voltages across said welding arc conductors and said voltage establishing means so long as the voltage across said welding arc conductors is less than a predetermined value, said first relay having an operating winding which is connected across said welding arc conductors in circuit with one of said voltages of said voltage establishing means and which is also connected across said voltage establishing means through the normally closed contacts of said second relay which has normally open contacts controlling the connection of said welding circuit with said supply circuit and said second mentioned relay having an operating winding connected across said welding arc conductors in circuit with another of said voltages of said voltage establishing means and the normally open contacts of said first relay.

15. Alternating current arc welding apparatus comprising a supply circuit, a welding circuit having an inductive device connected in circuit with a pair of conductors for energizing a welding arc, a resistor, first and second relays having operating windings and contacts controlled thereby, one terminal of the operating winding of said first relay being connected to one of said welding arc conductors and one terminal of the operating winding of said second relay through the normally open contacts of said first relay, and said second relay having normally open contacts which complete the connection of said supply circuit with said welding arc conductors through said welding circuit and normally closed contacts which complete a shunt circuit through said resistor about said operating winding of said second relay and said normally open contacts of said first relay, and a voltage establishing means energized from said supply circuit and having a first terminal connected to the other of said welding arc conductors and second and third terminals respectively connected to the other terminals of said operating windings of said second and first relays, the voltage between said first and second terminals of said voltage establishing means having a magnitude sufficient to cause said second relay to close its said contacts when said welding arc conductors are short circuited before said welding circuit is connected to said supply circuit and sufficient when vectorially combined with an operating voltage across said welding arc conductors after said welding circuit has been connected to said supply circuit to produce a resultant voltage which causes said second relay to maintain its said contacts closed, the connected voltage of said voltage establishing means having a magnitude sufficient to cause said first relay to close its said contacts, and the voltage between said first and third terminals of said voltage establishing means having a magnitude sufficient when vectorially combined with said operating voltage across said welding arc conductors to produce a resultant voltage which causes said first relay to maintain its said contacts closed so long as said operating voltage is less than a predetermined value.

ALANSON U. WELCH, Jr.